(No Model.)
J. H. CULVER.
MACHINE FOR MAKING SPIRAL MOLDINGS.
No. 371,673. Patented Oct. 18, 1887.
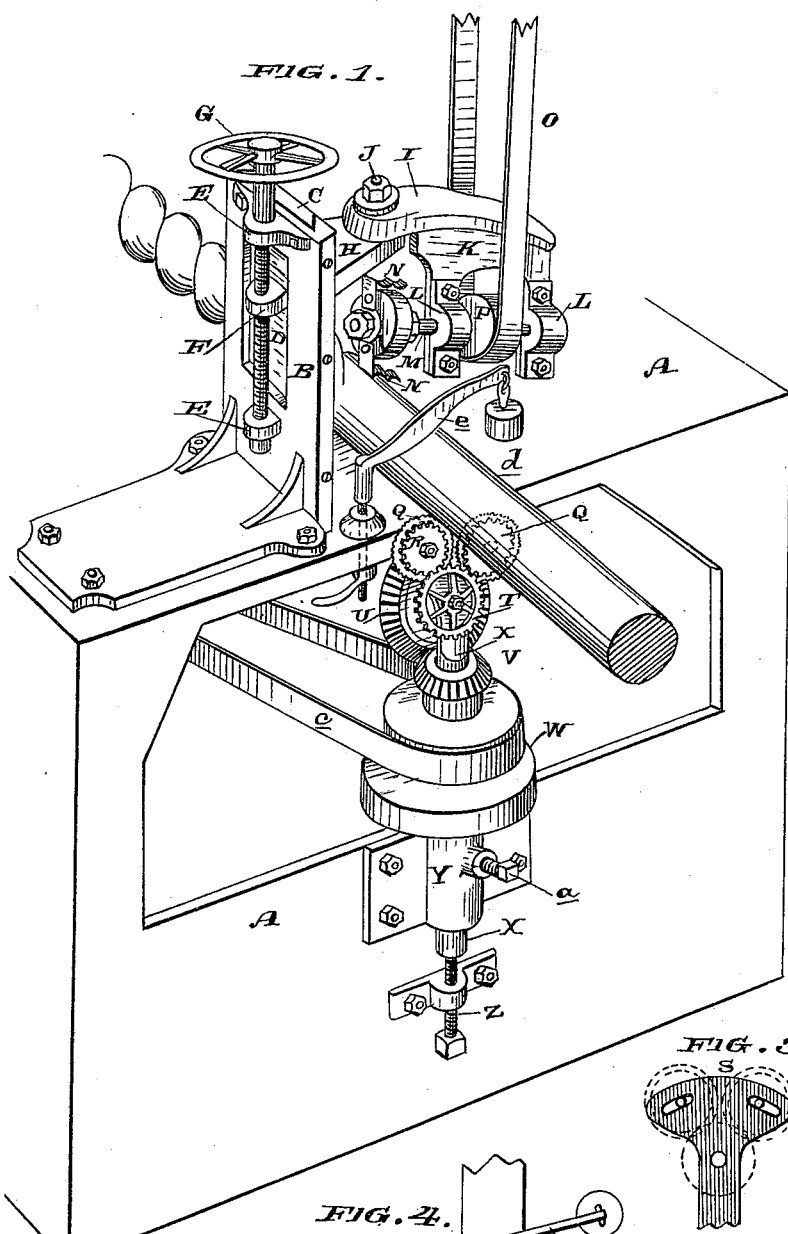
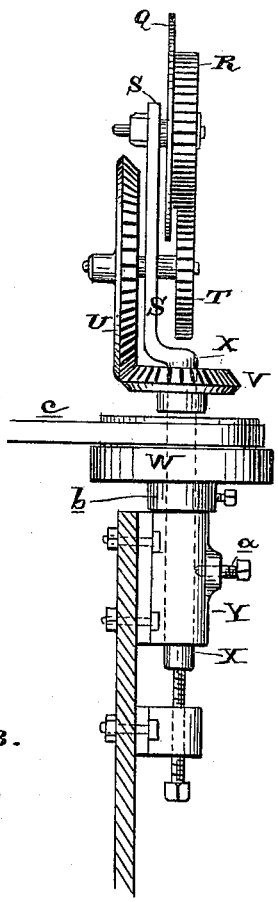
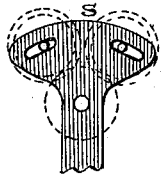
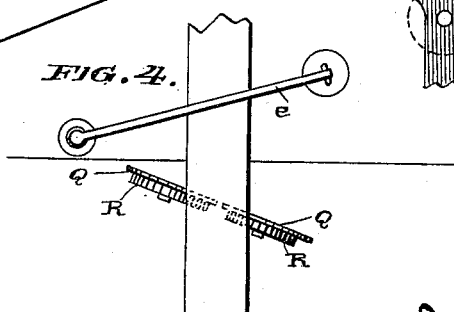
Witnesses,
Geo. H. Strong.
Inventor,
James H. Culver

UNITED STATES PATENT OFFICE.

JAMES H. CULVER, OF SAN FRANCISCO, CALIFORNIA.

MACHINE FOR MAKING SPIRAL MOLDINGS.

SPECIFICATION forming part of Letters Patent No. 371,673, dated October 18, 1887.

Application filed March 9, 1887. Serial No. 230,297. (No model.)

*To all whom it may concern:*

Be it known that I, JAMES HENRY CULVER, of the city and county of San Francisco, State of California, have invented an Improvement in Machines for Making Spiral Moldings; and I hereby declare the following to be a full, clear, and exact description of the same.

My invention relates to a machine for making or turning spiral or twist moldings.

It consists in certain details of construction whereby the angle of the cutters may be changed, so as to make a right or left spiral, and the cutters may also be adjusted to different diameters of molding.

It also consists in a peculiar adjustable feed mechanism, whereby the stick may be fed at any desired rate of speed, and also rotated in either direction to make a right or left cut or any required number of turns to the foot.

Referring to the accompanying drawings for a more complete explanation of my invention, Figure 1 is a perspective view of my device. Fig. 2 is a longitudinal vertical section taken through the feed mechanism. Fig. 3 is a view of the slotted plate by which the disks are supported. Fig. 4 shows the feed-disks and the supporting-bar.

A is a table or bench of any suitable shape, and B is a standard or plate extending vertically upward and having a base by which it is secured to the table.

A dovetailed groove or channel is made vertically in one side of this plate, and a piece, C, is fitted to travel up and down in this groove, being actuated by means of a screw, D, which is journaled in boxes E upon the standard B and travels in a nut, F, which projects from the sliding portion C. A hand-wheel, G, is fixed to the screw, so that the operator may turn it easily.

H is an arm projecting from the side of the sliding portion C, and to this is hinged a swinging arm, I, turning about a pivot-pin, J. A plate, K, projects downward from this swinging arm and has boxes L, in which the shaft M of the cutter-head is journaled. The cutters N are fixed to this head, so as to be rotated rapidly, the shaft being driven by a belt, O, passing around a pulley, P, as shown.

The cutters N are placed vertically beneath the pivot or fulcrum J, about which this portion of the device is turned, so that when the arm I is turned in one direction the cutters will stand in position to cut a right-hand thread or spiral upon the stick beneath, and when turned in the opposite direction the cutters will rotate in a plane which will cut a left-hand spiral. Any of the usual forms of tightening-pulleys may be applied to keep the belt O in proper position by means of a screw, D. The frame carrying the cutter-heads may be raised or depressed, so as to suit any diameter of molding which it is desired to make, by means of the screw, as before described.

In order to feed the molding and rotate it at the same time I employ disks Q, which may be toothed, corrugated, rubber, or rubber-faced, and are secured upon the same shafts with gear-wheels or pinions R, and these gear-wheels have their bearing pins or axles fixed in slots in the plates S. At a point lower down in the same plate is journaled a shaft, upon which is fixed a gear-wheel, T, which drives the pinions R, and at the rear of the plate is the beveled wheel U, which is driven by a pinion, V, upon the vertical sleeve carrying the driving cone-pulley W.

The plate S extends downward, and at a point below the gear-wheel T it connects with a vertical shaft or spindle, X, which passes down through the sleeve carrying the pinion V, attached to the pulley W. This shaft extends down through a box, Y, bolted to the side of the table, and is supported upon the end of a screw, Z, by which it may be raised and lowered at will. When raised, it raises the disks Q upward, and when depressed it draws them downward, so as to suit smaller or larger sizes of material from which the molding is to be made.

*a* is a set-screw passing through the box G, so as to bind against the spindle X and hold it wherever desired. *b* is a collar, also attached to this spindle by a set-screw, which serves to hold the pulley W in the proper place. The pulley W is driven by a belt, *c*, from any suitable counter-shaft. The disks Q may be made of metal, with teeth in them similar to the teeth of a saw, or they may be corrugated or made of rubber or similar material, and, as they stand in the same plane and partially side by side, it will be manifest that the stick *d*, from which the molding is to be cut, will rest upon the periphery of these disks, and when they are rotated they also cause the stick to rotate, its opposite end passing out beneath the cutters N.

In order to advance the stick as fast as is necessary with relation to its rotation, so as to cut the proper spiral upon it, the spindle X is turned around until the disks Q stand at a greater or less angle with the stick d, and their rotation then rotates the stick and also advances it simultaneously. If the stick is to be rotated in the opposite direction, the set-screw a is loosened and the spindle X is turned around, carrying with it the plate S, upon which the disks Q are supported or journaled, and the angle may be changed so that they stand at an opposite angle with the line of the stick. The position of the cutters N is also changed at the same time, so as to be in readiness to cut in the new direction.

The whole device forms a very easily adjustable mechanism for cutting spiral moldings upon any size with any desired twist, and either right or left. The stick is held firmly in contact with the rotating feed disks and table by means of an adjustable weighted arm attached to the table, which is set on the angle of the cutters, and may have on its lower edge, which rests upon the stick, a knife, flat surface, or a roller, as preferred.

Having thus described my invention, what I claim as new, and desire to secure by Letters Patent, is—

1. A twist-molding machine having the cutters adjustable with relation to the molding, as shown, in combination with the feed mechanism consisting of the toothed, corrugated, or rubber disks upon which the cylindrical stick rests, a driving mechanism by which the disks are rotated, and a support for said disks about its center, so as to change or increase the angle at which the disks stand with relation to the stick, so as to advance it with greater or less rapidity, substantially as herein described.

2. The disks for revolving the molding, having their axles fixed in a plate attached to a vertical support passing through a suitable box, and a set-screw by which said support may be held so that the disks stand at any desired angle in either direction with relation to the molding, in combination with the driving mechanism whereby the disks are rotated, substantially as described.

3. The angularly-adjustable feed-disks standing in the same plane and supported upon a vertically-adjustable plate or standard to suit the diameter of the molding, said standard being also adjustable about a vertical axis, so as to change the angle around which the disks revolve with relation to the molding being cut, in combination with gears by which the disks are rotated, and a pulley and belt whereby they are driven, substantially as herein described.

4. The stick supporting, rotating, and feeding toothed, corrugated, or rubber disks journaled upon a plate adjustable about a vertical axis to change the angle of the disks with relation to the stick, as described, and pulleys and belts whereby the disks are driven, as shown, in combination with a screw or rack, Z Z, whereby the disks may be raised or depressed and adjusted to different diameters, substantially as herein described.

5. The horizontally-moving stick from which the molding is cut, and the supporting, rotating, and feeding disks, adjustable so as to increase or diminish the rate of feed, as shown, in combination with a lever extending across and resting upon the stick in a plane above the feeding-disks, substantially as herein described.

In witness whereof I have hereunto set my hand.

JAMES H. CULVER.

Witnesses:
S. H. NOURSE,
H. C. LEE.